United States Patent
Takano et al.

(10) Patent No.: US 7,304,444 B2
(45) Date of Patent: Dec. 4, 2007

(54) BATTERY VEHICLE AND METHOD OF CONTROLLING THE SAME

(75) Inventors: Shinichi Takano, Kanagawa-ken (JP); Mitsugu Nakamura, Aichi-ken (JP); Teruo Mizuno, Kanagawa-ken (JP); Kazuya Fukuda, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 105 days.

(21) Appl. No.: 11/350,736

(22) Filed: Feb. 10, 2006

(65) Prior Publication Data
US 2006/0192430 A1   Aug. 31, 2006

(30) Foreign Application Priority Data
Feb. 25, 2005   (JP) .............................. 2005-051832

(51) Int. Cl.
*H02P 7/68* (2006.01)
*H02P 7/74* (2006.01)

(52) U.S. Cl. .............................. 318/34; 318/41; 700/2; 700/3; 180/65.1

(58) Field of Classification Search .................. 318/34, 318/41, 48, 139, 254, 85, 636, 432, 434, 318/727, 801; 180/65.1; 700/2, 3, 19, 20
See application file for complete search history.

(56) References Cited

U.S. PATENT DOCUMENTS

| | | | | |
|---|---|---|---|---|
| 5,414,339 A | * | 5/1995 | Masaki et al. | 318/800 |
| 5,805,797 A | * | 9/1998 | Sato et al. | 714/48 |
| 5,903,565 A | * | 5/1999 | Neuhaus et al. | 370/402 |
| 6,864,646 B2 | * | 3/2005 | Rahman et al. | 318/41 |
| 7,005,819 B2 | * | 2/2006 | Takai et al. | 318/432 |
| 7,049,784 B2 | * | 5/2006 | Suzuki | 318/636 |
| 7,071,639 B2 | * | 7/2006 | Ochiai et al. | 318/139 |
| 2004/0160201 A1 | * | 8/2004 | Rahman et al. | 318/41 |
| 2004/0207349 A1 | * | 10/2004 | Suzuki | 318/254 |
| 2006/0091835 A1 | * | 5/2006 | Ochiai et al. | 318/139 |

FOREIGN PATENT DOCUMENTS

JP   6-326908 A   11/1994

* cited by examiner

*Primary Examiner*—Paul Ip
(74) *Attorney, Agent, or Firm*—Birch, Stewart, Kolasch & Birch, LLP

(57) ABSTRACT

A battery vehicle includes a battery configured to supply DC power, and first and second motors configured to drive first and second wheels in response to first and second motor drive powers, respectively. A first inverters generates a first control data and supplies the first motor drive power to the first motor from the DC power while limiting the first motor drive power based on the first control data and a second data. A second inverter generates the second control data and supplies the second motor drive power to the second motor from the DC power while limiting the second motor drive power based on the first and second control data.

20 Claims, 3 Drawing Sheets

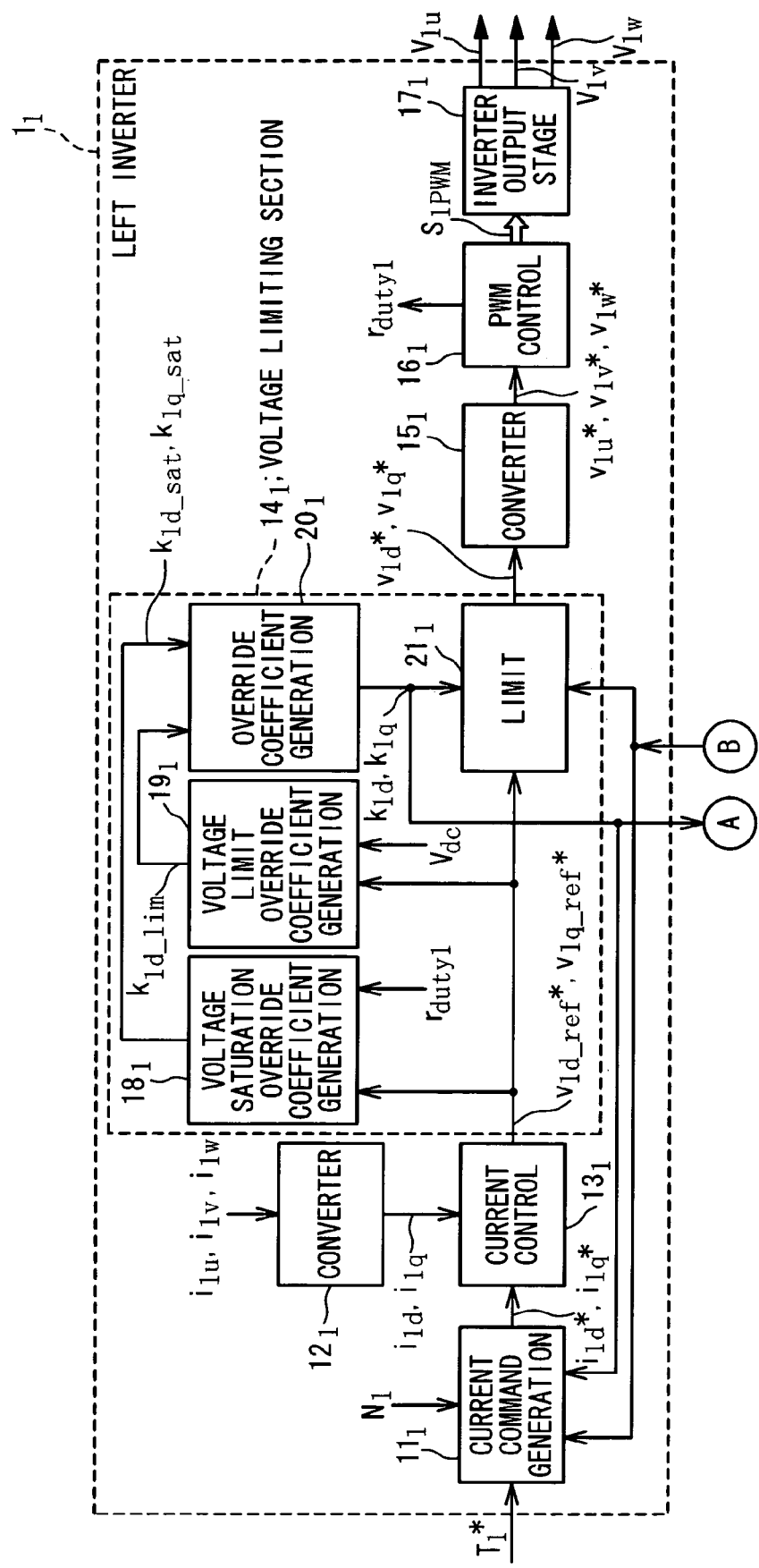

BATTERY VEHICLE AND METHOD OF CONTROLLING THE SAME

BACKGROUND OF THE INVENTION

1. Field of the Invention

The present invention relates to a battery vehicle, and more particularly, to a battery vehicle in which wheels are independently driven by separate inverters and motors.

2. Description of the Background Art

In battery vehicles such as a battery folk lift, a drive system may be adopted in which two right and left wheels are independently driven by separate inverters and motors. Such a driving system is effective for simplifying a power transmission mechanism and improving driving efficiency.

It is important for general systems including two or more motors that these motors are cooperatively controlled to improve energy efficiency as a whole. A technique of cooperatively controlling a plurality of motors is disclosed in, for example, Japanese Laid Open Patent Application (JP-A-Heisei 6-326908). According to this conventional technique, optimum current distribution to the plurality of motors is achieved by setting priority levels to a plurality of motors when a driving current is required from the motors.

An important thing in a driving system using a battery as a power source is to make efficient use of the battery. For this purpose, an inverter is preferably controlled to output a closest output voltage to a battery voltage. However, this control sometimes causes problems when variation arises in characteristics of two motors.

Firstly, when there is variation in characteristics of the motors, there is a case where an output voltage necessary for outputting a required torque is lower than the battery voltage in one motor while being higher than the battery voltage in the other motor. In such a case, to protect the latter motor and the inverter connected thereto, the inverter connected to the latter motor must be controlled to output an output voltage smaller than the output voltage necessary for outputting the required torque. However, torques of the right and left wheels does not become same through a simple control of the output voltage so that the battery vehicle moves in an undesirable direction.

Secondly, when regeneration of power to the battery is carried out, there is a case where a regeneration voltage supplied from one motor to the battery through the inverter may be smaller than an allowable maximum voltage while a regeneration voltage supplied from the other motor to the battery through the inverter may be larger than the allowable maximum voltage. In such a case, in order to protect the battery, it is necessary to carry out a weak field control of the latter motor to decrease the regeneration voltage. However, when the field weakening control of the latter motor is carried out, the torques of the right and left wheels are not same so that the battery vehicle moves in an undesirable direction. If a battery having a sufficiently high battery voltage is used in consideration of variation in characteristics of the two motors, the above problems may be avoided. However, the use of such a battery is problematic in terms of economical efficiency.

Therefore, a battery vehicle is demanded which can make best use of capabilities of a battery even when variation arises in characteristics of two motors driving the wheels.

SUMMARY OF THE INVENTION

An object of the present invention is to provide a battery vehicle capable of making best use of capabilities of a battery even when variation arises in characteristics of two motors driving the wheels.

In an aspect of the present invention, a battery vehicle includes a battery configured to supply DC power, and first and second motors configured to drive first and second wheels in response to first and second motor drive powers, respectively. A first inverter generates a first control data and supplies the first motor drive power to the first motor from the DC power while limiting the first motor drive power based on the first control data and a second data. A second inverter generates the second control data and supplies the second motor drive power to the second motor from the DC power while limiting the second motor drive power based on the first and second control data.

Here, the first inverter may include a first reference voltage command generating section configured to generate a first reference voltage command based on a first torque command; a first voltage limiting section configured to generate the first control data and to limit the first reference voltage command based on the first and second control data to generate a first voltage command; and a first power outputting section configured to output the first motor drive power to the first motor based on the first voltage command. Also, the second inverter may include a second reference voltage command generating section configured to generate a second reference voltage command based on a second torque command; a second voltage limiting section configured to generate the second control data and to limit the second reference voltage command based on the first and second control data to generate a second voltage command; and a second power outputting section configured to output the second motor drive power to the second motor based on the second voltage command.

The battery vehicle may further include first and second current sensors configured to sense first and second currents supplied from the first and second inverters to the first and second motors, respectively. In this case, the first and second reference voltage command generating sections generate the first and second reference voltage commands based on the first and second currents and first and second rotation frequencies of the first and second motors in addition to the first and second torque commands, respectively.

In the above, the first reference voltage command generating section may include a first current command generation section configured to generate a first current command based on the first torque command; a first phase converter section configured to generate a first conversion current from the first current; and a first current control section configured to generate the first reference voltage command based on the first current command and the first conversion current. Also, the second reference voltage command generating section may include a second current command generation section configured to generate a second current command based on the second torque command; a second phase converter section configured to generate a second conversion current from the second current; and a second current control section configured to generate the second reference voltage command based on the second current command and the second conversion current.

The first reference voltage command generating section may generate the first reference voltage command based on the first and second control data in addition to the first current and the first rotation frequency of the first motor, and the first torque command. In this case, the second reference voltage command generating section generates the second reference voltage command based on the first and second control data in addition to the second current and the second rotation frequency of the second motor, and the second torque command. Also, the first current command generation section may generate the first current command based on the first and second control data in addition to the first torque command. In this case, the second current command generation section generates the second current command based on the first and second control data in addition to the second torque command.

Also, the first power outputting section may include a third phase converter section configured to generate a first conversion voltage command from the first voltage command; a first PWM (Pulse Width Modulation) control section configured to generate a first PWM signal from the first conversion voltage command; and a first output stage configured to output the first motor drive power to the first motor in response to the first PWM signal. Also, the second power outputting section may include a fourth phase converter section configured to generate a second conversion voltage command from the second voltage command; a second PWM control section configured to generate a second PWM signal from the second conversion voltage command; and a second output stage configured to output the second motor drive power to the second motor in response to the second PWM signal.

Also, the battery vehicle may further include a voltage sensor configured to sense a voltage of the battery. In this case, the first reference voltage command includes a first d-axis reference voltage command and a first q-axis reference voltage command, and the second reference voltage command includes a second d-axis reference voltage command and a second q-axis reference voltage command. In this case, the first voltage limiting section includes a first voltage limit override coefficient generation section configured to generate a first d-axis voltage limit override coefficient ($k_{1d\_lim}$) based on the first d-axis reference voltage command and the sensed battery voltage; a first override coefficient generation section configured to generate a first d-axis override coefficient ($k_{1d}$) as the first control data from the first d-axis voltage limit override coefficient; and a first limit section configured to limit the first reference voltage command based on the first control data and the second control data to generate the first voltage command. Also, the second voltage limiting section includes a second voltage limit override coefficient generation section configured to generate a second d-axis voltage limit override coefficient ($k_{2d\_lim}$) based on the second d-axis reference voltage command and the sensed battery voltage; a second override coefficient generation section configured to generate a second d-axis override coefficient ($k2_d$) as the second control data from the second d-axis voltage limit override coefficient; and a second limit section configured to limit the second reference voltage command based on the first control data and the second control data to generate the second voltage command.

In this case, the first voltage limiting section may further include a first voltage saturation override coefficient generation section configured to generate a first d-axis voltage saturation override coefficient ($k_{1d\_sat}$) and a first q-axis voltage saturation override coefficient ($k_{1q\_sat}$) from the first reference voltage command. The first override coefficient generation section generates a first q-axis override coefficient ($k_{1q}$) in addition to the first d-axis override coefficient ($k_{1d}$) as the first control data from the first d-axis voltage saturation override coefficient ($k_{1d\_sat}$) and the first q-axis voltage saturation override coefficient ($k_{1q\_sat}$) in addition to the first d-axis voltage limit override coefficient. The second voltage limiting section may further include a second voltage saturation override coefficient generation section configured to generate a second d-axis voltage saturation override coefficient ($k_{2d\_sat}$) and a second q-axis voltage saturation override coefficient ($k_{2q\_sat}$) from the second reference voltage command. The second override coefficient generation section generates a second q-axis override coefficient ($k_{2q}$) in addition to the second d-axis override coefficient ($k_{2d}$) as the second control data from the second d-axis voltage saturation override coefficient ($k_{2d\_sat}$) and the second q-axis voltage saturation override coefficient ($k_{2q\_sat}$) in addition to the second d-axis voltage limit override coefficient.

Also, the first power outputting section may include a first PWM control section configured to determine a first duty ratio of a first conversion voltage command corresponding to the first voltage command to generate a first PWM signal. The first voltage saturation override coefficient generation section generates the first d-axis voltage saturation override coefficient ($k_{1d\_sat}$) and the first q-axis voltage saturation override coefficient ($k_{1q\_sat}$) from the first reference voltage command based on the first duty ratio. The second power outputting section includes a second PWM control section configured to determine a second duty ratio of a second conversion voltage command corresponding to the second voltage command to generate a second PWM signal. The second voltage saturation override coefficient generation section generates the second d-axis voltage saturation override coefficient ($k_{2d\_sat}$) and the second q-axis voltage saturation override coefficient ($k_{2q\_sat}$) from the second reference voltage command based on the second duty ratio.

Also, the first override coefficient generation section may generate the first d-axis override coefficient ($k_{1d}$) by multiplying the first d-axis voltage saturation override coefficient ($k_{1d\_sat}$) and the first d-axis voltage limit override coefficient ($k_{1d\_lim}$), and the first q-axis voltage saturation override coefficient ($k_{1q\_sat}$) as the first q-axis override coefficient ($k_{1q}$). At this time, the second override coefficient generation section generates the second d-axis override coefficient ($k_{2d}$) by multiplying the second d-axis voltage saturation override coefficient ($k_{2d\_sat}$) and the second d-axis voltage limit override coefficient ($k_{2d\_lim}$), and the second q-axis voltage saturation override coefficient ($k_{2q\_sat}$) as the second q-axis override coefficient ($k_{2q}$).

Also, the first limit section may generate the first voltage command by limiting the first d-axis reference voltage command based on a smaller one of the first d-axis override coefficient ($k_{1d}$) and the second d-axis override coefficient ($k_{2d}$) and the first q-axis reference voltage command based on the first q-axis voltage saturation override coefficient ($k_{1q\_sat}$). Also, the second limit section may generate the second voltage command by limiting the second d-axis reference voltage command based on a smaller one of the first d-axis override coefficient ($k_{1d}$) and the second d-axis override coefficient ($k_{2d}$) and the second q-axis reference voltage command based on the second q-axis voltage saturation override coefficient ($k_{2q\_sat}$).

Also, a set of the first motor and the first wheel and a set of the second motor and the second wheel are preferably provided both sides of the battery vehicle, respectively.

In another aspect of the present invention, a method of controlling a battery vehicle with wheels on both sides of the battery vehicle, is achieved by generating first and second control data; by outputting a DC power from a battery; by supplying a first motor drive power to a first motor from the DC power, while limiting the first motor drive power based on the first control data and a second data; by supplying a second motor drive power to a second motor from the DC power, while limiting the second motor drive power based on the first control data and a second data; and by driving the first and second wheels in response to the first and second motor drive powers, respectively.

Here, the supplying a first motor drive power is achieved by generating a first reference voltage command based on a first torque command; by limiting the first reference voltage command based on the first and second control data to generate a first voltage command; and by outputting the first motor drive power to the first motor based on the first voltage command. The supplying a second motor drive power is achieved by generating a second reference voltage command based on a second torque command; by limiting the second reference voltage command based on the first and second control data to generate a second voltage command; and by outputting the second motor drive power to the second motor based on the second voltage command.

BRIEF DESCRIPTION OF THE DRAWINGS

FIGS. 2A and 2B are block diagrams showing the configuration of a left inverter and a right inverter in the embodiment of the present invention.

DESCRIPTION OF THE PREFERRED EMBODIMENTS

Hereinafter, a battery vehicle according to the present invention will be described in detail with reference to the attached drawings.

Figure 1:
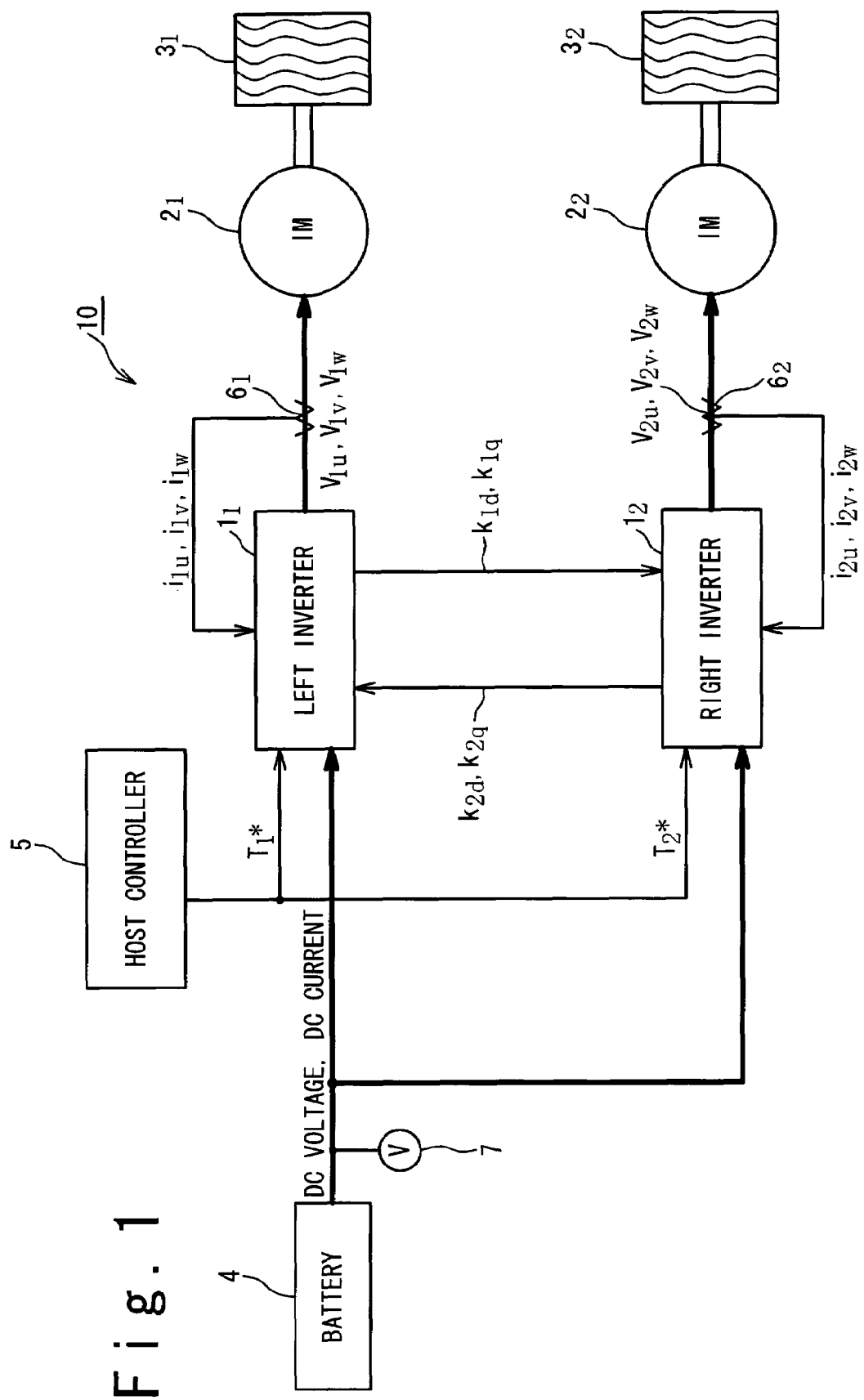
FIG. 1 is a block diagram showing a configuration of a battery vehicle according to an embodiment of the present invention.

FIG. 1 is a block diagram showing a battery vehicle 10 according to an embodiment of the present invention. The battery vehicle 10 is provided with a left inverter $1_1$, a right inverter $1_2$, a left induction motor $2_1$, a right induction motor $2_2$, a left wheel $3_1$, a right wheel $3_2$, a battery 4 and a host controller 5. It should be noted that a reference numeral with the subscript "1" represents a component on the "left side" and a reference numeral with the subscript "2" represent a component on the "right side" in the whole of this specification.

The left inverter $1_1$ generates 3-phase AC power from DC power supplied from the battery 4 and supplies the 3-phase AC power to the left induction motor $2_1$ to drive the left wheel $3_1$. A power cable for supplying the 3-phase AC power from the left inverter $1_1$ to the left induction motor $2_1$ is provided with a current sensor $6_1$ to measure a u-phase current $i_{1u}$, a v-phase current $i_{1v}$ and a w-phase current $i_{1w}$ of the left induction motor $2_1$. The left inverter $1_1$ generates the 3-phase AC power by carrying out vector control based on the u-phase current $i_{1u}$, the v-phase current $i^{1v}$ and the w-phase current $i_{1w}$.

Similarly, the right inverter $1_2$ generates 3-phase AC power from the DC power supplied from the battery 4 and supplies the 3-phase AC power to the right induction motor $2_2$ to drive the right wheel $3_2$. A power cable for supplying the 3-phase AC power from the right inverter $1_2$ to the right induction motor $2_2$ is provided with a current sensor $6_2$ to measure a u-phase current $i_{2u}$, a v-phase current $i_{2v}$ and a w-phase current $i_{2w}$ of the right induction motor $2_2$. The right inverter $1_2$ generates the 3-phase AC power by carrying out a vector control based on the u-phase current $i_{2u}$, the v-phase current $i_{2v}$ and the w-phase current $i_{2w}$.

A power line for supplying the DC power to the left inverter $1_1$ and the right inverter $1_2$ from the battery 4 is provided with a voltage sensor 7. The voltage sensor 7 measures a battery voltage $V_{dc}$ (that is, a voltage across a positive electrode and a negative electrode in the battery 4). The battery voltage $V_{dc}$ measured by the voltage sensor 7 is used to control regeneration of power to the battery 4.

The left inverter $1_1$ and the right inverter $1_2$ are controlled by the host controller 5. The host controller 5 generates a left torque command $T_1^*$ and a right torque command $T_2^*$ in response to an accelerator opening and a steering angle (not shown). The left torque command $T_1^*$ and the right torque command $T_2^*$ are usually a same value. The left torque command $T_1^*$ is supplied to the left inverter $1_1$ and the right torque command $T_2^*$ is supplied to the right inverter $1_2$.

The left inverter $1_1$ and the right inverter $1_2$ is not controlled only by the host controller 5, but one inverter of them is controlled in response to control data which is received from the other inverter through the communication with each other. More specifically, when the left inverter $1_1$ carries out a control operation of limiting a d-axis voltage and a q-axis voltage for protection of the whole system, the left inverter $1_1$ transmits the control data indicating a limit degree of the d-axis voltage and the q-axis voltage to the right inverter $1_2$. In response to the control data transmitted from the left inverter $1_1$, the right inverter $1_2$ carries out the control operation of limiting the d-axis voltage and the q-axis voltage. Similarly, when the right inverter $1_2$ carries out a control operation of limiting the d-axis voltage and the q-axis voltage for protection of the whole system, the right inverter $1_2$ transmits the control data indicating a limit degree of the d-axis voltage and the q-axis voltage to the left inverter $1_1$. Like the right inverter $1_2$, in response to the control data transmitted from the right inverter $1_2$, the left inverter $1_1$ carries out a control operation of limiting the d-axis voltage and the q-axis voltage.

In this embodiment, the control data transmitted from the left inverter $1_1$ to the right inverter $1_2$ includes a d-axis override coefficient $k_{1d}$ and a q-axis override coefficient $k_{1q}$. The d-axis override coefficient $k_{1d}$ and the q-axis override coefficient $k_{1q}$ are coefficients in a range of "0" to "1" to indicate how degrees of a d-axis voltage command $v_{1d}^*$ and a q-axis voltage command $v_{1q}^*$ are limited in the left inverter $1_1$, respectively. When the control operation of limiting the d-axis voltage command $v_{1d}^*$ and the q-axis voltage command $v_{1q}^*$ is not carried out, both of the d-axis override coefficient $k_{1d}$ and the q-axis override coefficient $k_{1q}$ take "1". When the d-axis voltage command $v_{1d}^*$ and the q-axis voltage command $v_{1q}^*$ determined from the left torque command $T_1^*$ and a rotation frequency $N_1$ of the left induction motor $2_1$ are too large to protect the system, the d-axis override coefficient $k_{1d}$ and the q-axis override coefficient $k_{1q}$ are decreased according to the limit degrees of the d-axis voltage command $v_{1d}^*$ and the q-axis voltage command $v_{1q}^*$. In response to the d-axis override coefficient $k_{1d}$ and the q-axis override coefficient $k_{1q}$ supplied from the left inverter $1_1$, the right inverter $1_2$ decreases a d-axis voltage command $v_{2d}^*$ and a q-axis voltage command $v_{2q}^*$ generated therein.

Similarly, the control data transmitted from the right inverter $1_2$ to the left inverter $1_1$ includes a d-axis override coefficient $k_{2d}$ and a q-axis override coefficient $k_{2q}$. The d-axis override coefficient $k_{2d}$ and the q-axis override coefficient $k_{2q}$ are coefficients in a range of "0" to "1" to indicate the limit degrees of the d-axis voltage command $v_{2d}^*$ and the q-axis voltage command $v_{2q}*$ in the right inverter $1_2$. In response to the d-axis override coefficient $k_{2d}$ and the q-axis override coefficient $k_{2q}$ supplied from the right inverter $1_2$, the left inverter $1_1$ decreases a d-axis voltage command $v_{1d}*$ and a q-axis voltage command $v_{1q}*$ generated therein.

As described later, communication between the left inverter $1_1$ and the right inverter $1_2$ to exchange the control data (that is, d-axis override coefficient $k_{1d}$, the q-axis override coefficient $k_{1q}$, the d-axis override coefficient $k_{2d}$ and the q-axis override coefficient $k_{2q}$) is essential to prevent the battery vehicle 10 from possibly moving in an undesirable direction when the control operation of limiting the d-axis voltage command and the q-axis voltage command is carried out. The battery vehicle 10 is configured so that, when the control operation of limiting the d-axis voltage command and the q-axis voltage command is carried out in one of the left inverter $1_1$ and the right inverter $1_2$, the control operation of limiting the d-axis voltage command and the q-axis voltage command is carried out in the other of the left inverter $1_1$ and the right inverter $1_2$. Thus, it can be prevented that the battery vehicle 10 possibly moves in an undesirable direction. The control operations of the left inverter $1_1$ and the right inverter $1_2$ using the d-axis override coefficient kid, q-axis override coefficient $k_{1q}$, the d-axis override coefficient $k_{2d}$ and q-axis override coefficient $k_{2q}$ will be described below in detail.

Figure 2B:
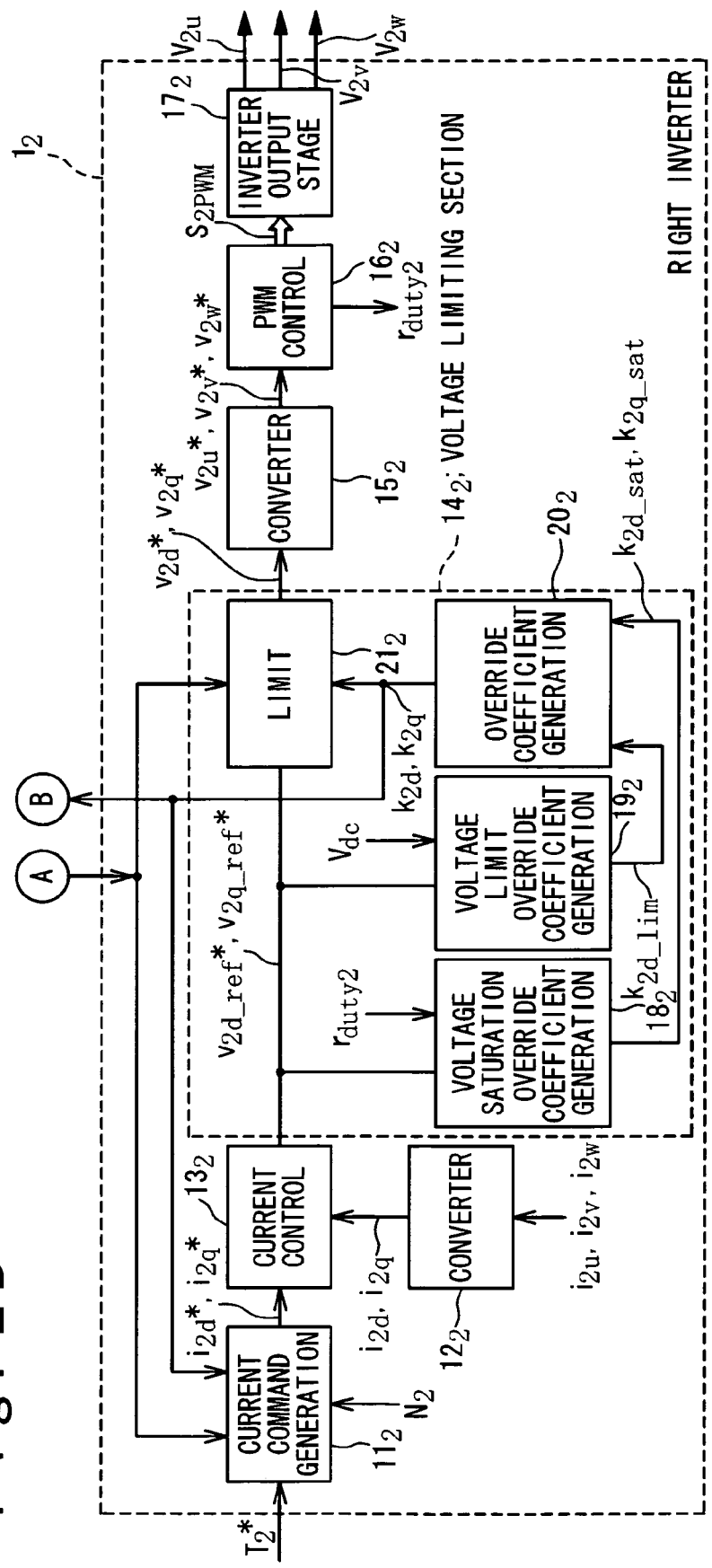

FIGS. 2A and 2B are block diagrams showing the configuration of the left inverter $1_1$ and the right inverter $1_2$. The left inverter $1_1$ and the right inverter $1_2$ have a same configuration and function. Therefore, the configuration and operation of only the left inverter $1_1$ will be described hereinafter. Those skilled in the art could easily understand that the function of components of the right inverter $1_2$ with reference to description of the function of the corresponding components of the left inverter $1_1$. It should be noted that a numeral subscript "1" is added to the components of the left inverter $1_1$ and control data generated by the left inverter $1_1$ and a numeral subscript "2" is added to the components of the right inverter $1_2$ and control data generated by the right inverter $1_2$.

The left inverter $1_1$ is provided with a current command generation section $11_1$, a 3-to-2 phase converter section $12_1$, a current control section $13_1$, a voltage limiting section $14_1$, a 2-to-3 phase converter section $15_1$, a PWM control section $16_1$ and an inverter output stage $17_1$. The current command generation section $11_1$, the 3-to-2 phase converter section $12_1$, the current control section $13_1$, the voltage limiting section $14_1$, the 2-to-3 phase converter section $15_1$ and the PWM control section $16_1$ configure a control system for generating a PWM signal $S_{1PWM}$ to control ON/OFF of each of power transistors (not shown) mounted on the inverter output stage $17_1$, and is typically realized by a DSP (Digital Signal Processor). A common control clock is fed to the current command generation section $11_1$, the 3-to-2 phase converter section $12_1$, the current control section $13_1$, the voltage limiting section $14_1$, the 2-to-3 phase converter section $15_1$ and the PWM control section $16_1$, and these sections are configured to carry out respective operations in response to the control clock. Each component of the left inverter $1_1$ will be described below in detail.

The current control generation section $11_1$ generates a d-axis current command $i_{1d}*$ and a q-axis current command $i_{1q}*$ in response to the left torque command $T_1*$ transmitted from the host controller 5 and the rotation frequency $N_1$ of the left induction motor $2_1$.

The 3-to-2 phase converter section $12_1$ carries out d-q conversion of the u-phase current $i_{1u}$, the v-phase current $i_{1v}$ and the w-phase current $i_{1w}$ which are measured by the current sensor $6_1$ and calculates a d-axis current $i_{1d}$ and a q-axis current $1_{iq}$. As apparent to those skilled in the art, the calculation of the d-axis current $i_{1d}$ and the q-axis current $1_{iq}$ does not necessarily require all of the u-phase current $i_{1u}$, the v-phase current $i_{1v}$ and the w-phase current $i_{1w}$, and it is possible to calculate the d-axis current $i_{1d}$ and the q-axis current $1_{iq}$ from two of these currents.

The current control section $13_1$ generates the d-axis voltage command and the q-axis voltage command so that the d-axis current $i_{1d}$ may correspond to or be equivalent to the d-axis current command $i_{1d}*$ and the q-axis current $i_{1q}$ may correspond to or be equivalent to the q-axis current command $i_{1q}*$. However, the d-axis voltage command and the q-axis voltage command generated by the current control section $13_1$ are not necessarily used. The d-axis voltage command and the q-axis voltage command are limited by the current limitation section $14_1$ and the limited d-axis voltage command and q-axis voltage command may be used ultimately. To clarify this point, the d-axis voltage command and the q-axis voltage command generated by the current control section $13_1$ can be referred to as a d-axis voltage command $V_{1d\_ref}*$ and a q-axis voltage command $v_{1q\_ref}*$.

The voltage limiting section $14_1$ limits the d-axis voltage command $V_{1d\_ref}*$ and the q-axis voltage command $v_{1q\_ref}*$ generated by the current control section $13_1$ to generate the d-axis voltage command $v_{1d}*$ and the q-axis voltage command $v_{1q}*$ to be used ultimately, according to necessity of protection of the driving system of the battery vehicle 10. The d-axis voltage command and the q-axis voltage command generated by the current control section $13_1$ are limited in the following three cases.

A first case is that the left inverter $1_1$ cannot output an inverter output voltage necessary for the left induction motor $2_1$ to generate a required torque. Most typically, such a case would occur when the inverter output voltage necessary for the left induction motor $2_1$ to generate the required torque is higher than the battery voltage of the battery 4. In such a case, the d-axis voltage command and the q-axis voltage command need to be limited.

A second case is that in regeneration of power, a regeneration voltage supplied from the left induction motor $2_1$ to the battery 4 through the left inverter $1_1$ is greater than an allowable maximum voltage. In such a case, the d-axis voltage command needs to be limited so that field-weakening control is carried out.

A third case is that a control operation of limiting the d-axis voltage command and the q-axis voltage command is carried out in the right inverter $1_2$. In such a case, when the control operation of limiting the d-axis voltage command $V_{2d\_ref}$ and the q-axis voltage command $v_{2q\_ref}$ is carried out in the right inverter $1_2$, the control operation of limiting the d-axis voltage command $v_{1d\_ref}$ and the q-axis voltage command $v_{1q\_ref}$ is also carried out in the left inverter $1_1$. As mentioned above, such a control operation is essential to prevent the battery vehicle 10 from possibly moving into an undesirable direction.

The configuration and operation of the voltage limiting section $14_1$ will be described later in detail.

The 2-to-3 phase converter section $15_1$ carries out 2-to-3 phase conversion of the d-axis voltage command $v_{1d}*$ and the q-axis voltage command $v_{1q}*$ ultimately determined by the voltage limiting section $14_1$ to generate the u-phase voltage command $v_{1u}*$, the v-phase voltage command $v_{1v}*$ and the w-phase voltage command $v_{1w}*$.

In response to the u-phase voltage command $v_{1u}*$, the v-phase voltage command $v_{1v}*$ and the w-phase voltage command $v_{1w}*$, the PWM control section $16_1$ generates a PWM signal $S_{1PWM}$ for controlling ON/OFF of each of power transistors (not shown) of the inverter output stage $17_1$. More particularly, in response to the u-phase voltage command $v_{1u}*$, the v-phase voltage command $v_{1v}*$ and the w-phase voltage command $v_{1w}*$, the PWM control section $16_1$ determines a duty ratio $r_{duty1}$ and generates the PWM signal $S_{1PWM}$ having a waveform corresponding to the duty ratio $r_{duty1}$.

In response to the PWM signal $S_{1PWM}$, the inverter output stage $17_1$ carries out switching of the power transistors, thereby generating 3-phase AC power from the DC power supplied from the battery 4. The 3-phase AC power outputted from the inverter output stage $17_1$ is fed to the left induction motor $2_1$.

It should be noted that the current command generation $11_1$, the 3-to-2 phase converter section $12_1$, the current control section $13_1$, the voltage limiting section $14_1$, the 2-to-3 phase converter section $15_1$ and the PWM control section $16_1$ may be implemented in hardware, software or a combination thereof.

Next, the voltage limiting section $14_1$ will be described in detail. The voltage limiting section $14_1$ has a voltage saturation override coefficient generation section $18_1$, a voltage limiting override coefficient generation section $19_1$, an override coefficient generation section $20_1$ and a limit processing section $21_1$.

The voltage saturation override coefficient generation section $18_1$ determines whether or not the left inverter $1_1$ can output an inverter output voltage necessary for the left induction motor $2_1$ to generate the required torque, that is, whether or not an inverter output voltage is saturated, and generates a d-axis voltage saturation override coefficient $k_{1d\_sat}$ and a q-axis voltage saturation override coefficient $k_{1q\_sat}$ according to the determination result.

More specifically, the d-axis voltage saturation override coefficient $k_{1d\_sat}$ and the q-axis voltage saturation override coefficient $k_{1q\_sat}$ are generated as follows. Firstly, the voltage saturation override coefficient generation section $18_1$ calculates the largest inverter output voltage $V_{1MAX}$ that the left inverter $1_1$ can output in the present clock cycle based on the duty ratio $r_{duty1}$ having used by the PWM control section $16_1$ in the previous clock cycle. Subsequently, a voltage saturation override amount $v_{sat}$ is determined according to the following equation (1).

$$v_{sat}=V_{1MAX}-\{(V_{1d\_ref}*)^2-(V_{1q\_ref}*)^2\}^{1/2} \quad (1)$$

As describe above, $v_{1d\_ref}*$ and $v_{1q\_ref}*$ are provisional d-axis voltage command and q-axis voltage command calculated by the current control section 131. When the voltage saturation override amount $v_{sat}$ is 0V or more, the voltage saturation override coefficient generation section $18_1$ determines that the d-axis voltage command and the q-axis voltage command need not be limited and sets both of the d-axis voltage saturation override coefficient $k_{1d\_sat}$ and the q-axis voltage saturation override coefficient $k_{1q\_sat}$ to "1". On the contrary, when the voltage saturation override amount $v_{sat}$ is less than 0V, the voltage saturation override coefficient generation $18_1$ determines that the left inverter $1_1$ cannot output the inverter output voltage necessary for the left induction motor $2_1$ to generate the required torque, that is, the d-axis voltage command and the q-axis voltage command need to be limited. In this case, the voltage saturation override coefficient generation $18_1$ generates the d-axis voltage saturation override coefficient $k_{1d\_sat}$ and the q-axis voltage saturation override coefficient $k_{1q\_sat}$ according to the following equations (2a) and (2b).

$$k_{1d\_sat}=1-\alpha_{1d} \quad (2a)$$

$$k_{1q\_sat}=1-\alpha_{1q} \quad (2b)$$

Here, $\alpha_{1d}$ is a positive value not more than 1 and increases as increase in the absolute value $|v_{sat}|$ of the voltage saturation override amount $v_{sat}$. Likewise, $\alpha_{1q}$ is a positive value not more than 1 and increases as increase in the absolute value $|v_{sat}|$ of the voltage saturation override amount $v_{sat}$.

The voltage limiting override coefficient generation section $19_1$ determines whether or not a regeneration voltage when power is regenerated to the battery, namely, a battery voltage $V_{dc}$ at the time of regeneration is larger than the largest allowable voltage of the battery 4, and generates a d-axis voltage limiting override coefficient $k_{1d\_lim}$ according to the determination result.

More specifically, the d-axis voltage limiting override coefficient $k_{1d\_lim}$ is calculated as follows. Firstly, a voltage limiting override amount $v_{lim}$ is calculated according to the following equation (3).

$$v_{lim}=V_{dcMAX}-V_{dc} \quad (3)$$

Here, $V_{dcMAX}$ is the largest allowable voltage of the battery 4 and is determined in advance according to the specification of the battery. On the other hand, $V_{dc}$ is the battery voltage measured by the voltage sensor 7. When the voltage limiting override amount $v_{lim}$ is 0V or more, the voltage limiting override coefficient generation section $19_1$ determines that the d-axis voltage command need not be limited and sets the d-axis voltage limiting override coefficient $k_{1d\_lim}$ to "1". On the contrary, when the voltage limiting override amount $v_{lim}$ is less than 0V, the voltage limiting override coefficient generation section $19_1$ determines that the regeneration voltage is larger than the largest allowable voltage of the battery 4, that is, it is necessary to limit the d-axis voltage command and carry out field-weakening control. In this case, the voltage limiting override coefficient generation section $19_1$ generates the d-axis voltage limiting override coefficient $k_{1d\_lim}$ according to the following equation (4).

$$k_{1d\_lim}=1-\beta_{1d} \quad (4)$$

Here, $\beta_{1d}$ is a positive value not more than 1 and increases as increase in the absolute value $|v_{lim}|$ of the voltage limiting override amount $v_{lim}$.

The override coefficient generation section $20_1$ generates the d-axis override coefficient $k_{1d}$ and the q-axis override coefficient $k_{1q}$, that are used to ultimately limit the d-axis voltage command and the q-axis voltage command, based on the d-axis voltage saturation override coefficient $k_{1d\_sat}$ and the q-axis voltage saturation override coefficient $k_{1q\_sat}$. Most simply, the override coefficient generation section $20_1$ generates the d-axis override coefficient $k_{1d}$ and the q-axis override coefficient $k_{1q}$ according to the following equations (5a) and (5b).

$$k_{1d}=k_{1d\_sat} \times k_{1d\_lim} \quad (5a)$$

$$k_{1q}=k_{1q\_sat} \quad (5b)$$

The limit processing section $21_1$ generates a final d-axis voltage command $v_{1d}*$ and q-axis voltage command $v_{1q}*$ from the provisional d-axis voltage command $v_{1d\_ref}*$ and q-axis voltage command $v_{1q\_ref}*$ which are generated by the current control section $13_1$, the d-axis override coefficient $k_{1d}$ and q-axis override coefficient $k_{1q}$ which are generated by the override coefficient generation $20_1$, and a d-axis override coefficient $k_{2d}$ and a q-axis override coefficient $k_{2q}$ which are supplied from the right inverter $1_2$. More specifically, the d-axis voltage command $v_{1d}*$ and the q-axis voltage command $V_{1q}*$ are generated according to the following equations (6a) and (6b).

$$v_{1d}* = \min[k_{1d}, k_{2d}] \cdot v_{1d\_ref}* \tag{6a}$$

$$v_{1q}* = \min[k_{1q}, k_{2q}] \cdot v_{1q\_ref}* \tag{6b}$$

Generation of the d-axis voltage command $v_{2d}*$ and the q-axis voltage command $v_{2q}*$ in the right inverter $1_2$ is carried out in a similar manner to the left inverter $1_1$.

In this way, when the control operation of limiting the d-axis voltage command and the q-axis voltage command is carried out in one of the left inverter $1_1$ and the right inverter $1_2$ through generation of the d-axis voltage command $v_{1d}*$, the q-axis voltage command $v_{1q}*$, the d-axis voltage command $v_{2d}*$ and the q-axis voltage command $v_{2q}*$, the control operation of limiting the d-axis voltage command and the q-axis voltage command is also carried out in the other of these inverters $1_1$ and $1_2$.

The d-axis override coefficient $k_{1d}$ and the q-axis override coefficient $k_{1q}$ which are generated in the left inverter $1_1$, and the d-axis override coefficient $k_{2d}$ and the q-axis override coefficient $k_{2q}$ which are generated in the right inverter $1_2$ are also used to limit the d-axis current command and the q-axis current command in the left inverter $1_1$ and the right inverter $1_2$. This prevents inadequately large d-axis current command and q-axis current command from being generated. For example, the fact that the d-axis override coefficient $k_{1d}$ and the q-axis override coefficient $k_{1q}$ are less than 1 in the left inverter $1_1$ means the d-axis current command $i_{1d}*$ and the q-axis current command $i_{1q}$ are excessively large in terms of protection of the system. In addition, the fact that the d-axis override coefficient $k_{1d}$ and the q-axis override coefficient $k_{1q}$ are less than 1 in the left inverter $1_1$ means that the control operation of limiting the d-axis voltage command and the q-axis voltage command in the right inverter $1_2$ is carried out. In such a case, the d-axis current command $i_{1d}*$ and the q-axis current command $i_{1q}$ are limited, thereby limiting the d-axis voltage command $v_{1d}*$ and the q-axis voltage command $v_{1q}*$ which are generated in the left inverter $1_1$. Similarly, the d-axis voltage command $v_{2d}*$ and the q-axis voltage command $v_{2q}*$ which are generated in the right inverter $1_2$ are limited.

More specifically, when detecting that at least one of the d-axis override coefficients $k_{1d}$ and $k_{2d}$ in the previous clock cycle is less than 1, the current command generation section $11_1$ of the left inverter $1_1$ determines a current value smaller than the d-axis current command $i_{1d}*$, that is determined based on the left torque command $T_1*$ and the rotation frequency $N_1$, as the d-axis current command $i_{1d}*$. In more detail, when only one of the d-axis override coefficients $k_{1d}$ and $k_{2d}$ is less than "1", the current command generation section $11_1$ determines the d-axis current command $i_{1d}*$ depending on the coefficient less than "1", and when both the d-axis override coefficients $k_{1d}$ and $k_{2d}$ are less than "1", the current command generation section 11, determines the d-axis current command $i_{1d}*$ depending on the smaller one of these coefficients. However, even when the d-axis override coefficients $k_{1d}$ and $k_{2d}$ return to "1", the current command generation section $11_1$ does not increase the d-axis current command $1_{id}*$ immediately. An increase rate of the d-axis current command $i_{1d}*$ is limited to be a predetermined value or less, and the d-axis current command $i_{1d}*$ is increased gradually.

Furthermore, when detecting that at least one of the q-axis override coefficients $k_{1q}$ and $k_{2q}$ in the previous clock cycle is less than 1, the current command generation section $11_1$ of the left inverter $1_1$ determines a current value smaller than the q-axis current command $i_{1q}*$ that is determined based on the left torque command $T_1*$ and the rotation frequency $N_1$, as the q-axis current command $i_{1q}*$. In more detail, when only one of the q-axis override coefficients $k_{1q}$ and $k_{2q}$ is less than "1", the current command generation section $11_1$ determines the q-axis current command $i_{1q}*$ depending on the one of the coefficients less than "1", and when both the q-axis override coefficients $k_{1q}$ and $k_{2q}$ are less than "1", the current command generation section $11_1$ determines the q-axis current command $i_{1q}*$ depending on the smaller one of the coefficients. However, even when the q-axis override coefficients $k_{1q}$ and $k_{2q}$ return to "1", the current command generation section $11_1$ does not increase the q-axis current command $1_{iq}*$ immediately. An increase rate of the q-axis current command $i_{1q}*$ is limited to be a predetermined value or less, and the q-axis current command $i_{1q}*$ is increased gradually.

A current command generation section $11_2$ of the right inverter $1_2$ carries out the same control operations as described above. The current command generation section $11_2$ determines a d-axis current command $i_{2d}*$ in response to the smaller one of the d-axis override coefficients $k_{1d}$ and $k_{2d}$ and a q-axis current command $i_{2q}*$ in response to the smaller one of the q-axis override coefficients $k_{1q}$ and $k_{2q}$.

According to such control operations, even when the voltage situation occurs that the inverter output voltage necessary for one of the motors to generate the required torque is lower than the battery voltage while the inverter output voltage necessary for the other of the motors to generate the required torque is higher than the battery voltage, it is possible to properly measure such a situation. Even when the control operation of limiting the d-axis voltage command and the q-axis voltage command is carried out to protect the motors and inverters, the battery vehicle 10 never moves into an undesirable direction. Thus, the allowable output voltage of the inverters can be made closer to the battery voltage, thereby making best use of the capabilities of the battery.

It should be noted that in the above embodiments, the d-axis voltage saturation override coefficients $k_{1d\_sat}$ and $k_{2d}$ sat are not generated and the d-axis voltage limiting override coefficients $k_{1d\_lim}$ and $k_{2d\_lim}$ may be used as the d-axis override coefficients $k_{1d}$ and $k_{2d}$. In other words, even when the left inverter $1_1$ cannot output the inverter output voltage necessary for the left induction motor $2_1$ to generate the required torque, only the q-axis voltage commands $v_{1q}*$ and $v_{2q}*$ may be limited and the d-axis voltage commands $v_{1d}*$ and $v_{2d}*$ and the d-axis current commands $i_{1d}*$ and $i_{2d}*$ may be not limited. This means that motor torque instead of motor output can be physically limited. It is apparent to those skilled in the art that such a control operation can also achieve the object of the present invention.

Furthermore, it would be apparent to those skilled in the art that the present invention can be applied to a case of driving the wheels of a tracked vehicle with an endless track as well as a vehicle using tires as wheels. In addition, it would be apparent to those skilled in the art that the present invention can be applied to a vehicle with multiple axes, that is, a battery vehicle having plural pairs of the left wheel $3_1$ and the right wheel $3_2$. In this case, the left wheel $3_1$ and the right wheel $3_2$ of each pair are also controlled in the above-mentioned manner.

According to the present invention, a battery vehicle can be provided to make best use of capabilities of a battery even when variation arises in characteristics of two motors driving the wheels.

What is claimed is:

1. A battery vehicle comprising:
   a battery configured to supply DC power;
   first and second motors configured to drive first and second wheels in response to first and second motor drive powers, respectively;
   a first inverter configured to generate a first control data and to supply said first motor drive power to said first motor from said DC power while limiting said first motor drive power based on said first control data and a second data; and
   a second inverter configured to generate said second control data and to supply said second motor drive power to said second motor from said DC power while limiting said second motor drive power based on said first and second control data.

2. The battery vehicle according to claim 1, wherein said first inverter comprises:
   a first reference voltage command generating section configured to generate a first reference voltage command based on a first torque command;
   a first voltage limiting section configured to generate said first control data and to limit said first reference voltage command based on said first and second control data to generate a first voltage command; and
   a first power outputting section configured to output said first motor drive power to said first motor based on said first voltage command, and
   said second inverter comprises:
   a second reference voltage command generating section configured to generate a second reference voltage command based on a second torque command;
   a second voltage limiting section configured to generate said second control data and to limit said second reference voltage command based on said first and second control data to generate a second voltage command; and
   a second power outputting section configured to output said second motor drive power to said second motor based on said second voltage command.

3. The battery vehicle according to claim 2, further comprising:
   first and second current sensors configured to sense first and second currents supplied from said first and second inverters to said first and second motors, respectively,
   wherein said first and second reference voltage command generating sections generate said first and second reference voltage commands based on said first and second currents and first and second rotation frequencies of said first and second motors in addition to said first and second torque commands, respectively.

4. The battery vehicle according to claim 3, wherein said first reference voltage command generating section comprises:
   a first current command generation section configured to generate a first current command based on said first torque command;
   a first phase converter section configured to generate a first conversion current from said first current; and
   a first current control section configured to generate said first reference voltage command based on said first current command and said first conversion current, and said second reference voltage command generating section comprises:
   a second current command generation section configured to generate a second current command based on said second torque command;
   a second phase converter section configured to generate a second conversion current from said second current; and
   a second current control section configured to generate said second reference voltage command based on said second current command and said second conversion current.

5. The battery vehicle according to claim 4, wherein said first reference voltage command generating section generates said first reference voltage command based on said first and second control data in addition to said first current and said first rotation frequency of said first motor, and said first torque command,
   said second reference voltage command generating section generates said second reference voltage command based on said first and second control data in addition to said second current and said second rotation frequency of said second motor, and said second torque command,
   said first current command generation section generates said first current command based on said first and second control data in addition to said first torque command, and
   said second current command generation section generates said second current command based on said first and second control data in addition to said second torque command.

6. The battery vehicle according to claim 2, wherein said first power outputting section comprises:
   a third phase converter section configured to generate a first conversion voltage command from said first voltage command;
   a first PWM (Pulse Width Modulation) control section configured to generate a first PWM signal from said first conversion voltage command; and
   a first output stage configured to output said first motor drive power to said first motor in response to said first PWM signal, and
   said second power outputting section comprises:
   a fourth phase converter section configured to generate a second conversion voltage command from said second voltage command;
   a second PWM control section configured to generate a second PWM signal from said second conversion voltage command; and
   a second output stage configured to output said second motor drive power to said second motor in response to said second PWM signal.

7. The battery vehicle according to claim 2, further comprising:
   a voltage sensor configured to sense a voltage of said battery,
   wherein said first reference voltage command comprises a first d-axis reference voltage command and a first q-axis reference voltage command, and said second reference voltage command comprises a second d-axis reference voltage command and a second q-axis reference voltage command,
   said first voltage limiting section comprises:
   a first voltage limit override coefficient generation section configured to generate a first d-axis voltage limit override coefficient based on said first d-axis reference voltage command and said sensed battery voltage;

a first override coefficient generation section configured to generate a first d-axis override coefficient as said first control data from said first d-axis voltage limit override coefficient; and a first limit section configured to limit said first reference voltage command based on said first control data and said second control data to generate said first voltage command, and said second voltage limiting section comprises:

a second voltage limit override coefficient generation section configured to generate a second d-axis voltage limit override coefficient based on said second d-axis reference voltage command and said sensed battery voltage;

a second override coefficient generation section configured to generate a second d-axis override coefficient as said second control data from said second d-axis voltage limit override coefficient; and a second limit section configured to limit said second reference voltage command based on said first control data and said second control data to generate said second voltage command.

8. The battery vehicle according to claim 7, wherein said first voltage limiting section further comprises:

a first voltage saturation override coefficient generation section configured to generate a first d-axis voltage saturation override coefficient and a first q-axis voltage saturation override coefficient from said first reference voltage command, said first override coefficient generation section generates a first q-axis override coefficient in addition to said first d-axis override coefficient as said first control data from said first d-axis voltage saturation override coefficient and said first q-axis voltage saturation override coefficient in addition to said first d-axis voltage limit override coefficient, said second voltage limiting section further comprises:

a second voltage saturation override coefficient generation section configured to generate a second d-axis voltage saturation override coefficient and a second q-axis voltage saturation override coefficient from said second reference voltage command, and said second override coefficient generation section generates a second q-axis override coefficient in addition to said second d-axis override coefficient as said second control data from said second d-axis voltage saturation override coefficient and said second q-axis voltage saturation override coefficient in addition to said second d-axis voltage limit override coefficient.

9. The battery vehicle according to claim 8, wherein said first power outputting section includes a first PWM control section configured to determine a first duty ratio of a first conversion voltage command corresponding to said first voltage command to generate a first PWM signal, said first voltage saturation override coefficient generation section generates said first d-axis voltage saturation override coefficient and said first q-axis voltage saturation override coefficient from said first reference voltage command based on said first duty ratio, said second power outputting section includes a second PWM control section configured to determine a second duty ratio of a second conversion voltage command corresponding to said second voltage command to generate a second PWM signal, and said second voltage saturation override coefficient generation section generates said second d-axis voltage saturation override coefficient and said second q-axis voltage saturation override coefficient from said second reference voltage command based on said second duty ratio.

10. The battery vehicle according to claim 8, wherein said first override coefficient generation section generates said first d-axis override coefficient by multiplying said first d-axis voltage saturation override coefficient and said first d-axis voltage limit override coefficient, and said first q-axis voltage saturation override coefficient as said first q-axis override coefficient, and said second override coefficient generation section generates said second d-axis override coefficient by multiplying said second d-axis voltage saturation override coefficient and said second d-axis voltage limit override coefficient, and said second q-axis voltage saturation override coefficient as said second q-axis override coefficient.

11. The battery vehicle according to claim 10, wherein said first limit section generates said first voltage command by limiting said first d-axis reference voltage command based on a smaller one of said first d-axis override coefficient and said second d-axis override coefficient and said first q-axis reference voltage command based on said first q-axis voltage saturation override coefficient, and said second limit section generates said second voltage command by limiting said second d-axis reference voltage command based on a smaller one of said first d-axis override coefficient and said second d-axis override coefficient and said second q-axis reference voltage command based on said second q-axis voltage saturation override coefficient.

12. The battery vehicle according to claim 1, wherein a set of said first motor and said first wheel and a set of said second motor and said second wheel are provided both sides of said battery vehicle, respectively.

13. A method of controlling a battery vehicle with wheels on both sides of said battery vehicle, comprising:

generating first and second control data;

outputting a DC power from a battery;

supplying a first motor drive power to a first motor from said DC power, while limiting said first motor drive power based on said first control data and a second data;

supplying a second motor drive power to a second motor from said DC power, while limiting said second motor drive power based on said first control data and a second data; and driving said first and second wheels in response to said first and second motor drive powers, respectively.

14. The method according to claim 13, wherein said supplying a first motor drive power comprises:

generating a first reference voltage command based on a first torque command;

limiting said first reference voltage command based on said first and second control data to generate a first voltage command; and outputting said first motor drive power to said first motor based on said first voltage command, and said supplying a second motor drive power comprises:

generating a second reference voltage command based on a second torque command;

limiting said second reference voltage command based on said first and second control data to generate a second voltage command; and outputting said second motor drive power to said second motor based on said second voltage command.

15. A battery vehicle comprising:
a battery configured to supply DC power;
first and second motors configured to drive first and second wheels, which are provided on both side with respect to a running direction of said battery vehicle, in response to first and second motor drive powers, respectively;
a first inverters configured to carry out a vector control based on a first torque command, generate a first control data based on an output voltage of said battery, and to supply said first motor drive power to said first motor from said DC power while limiting said first motor drive power based on said first control data and a second data; and
a second inverter configured to carry out a vector control based on a second torque command, to generate said second control data based on said output voltage of said battery, and to supply said second motor drive power to said second motor from said DC power while limiting said second motor drive power based on said first and second control data.

16. The battery vehicle according to claim 15, wherein said first inverter comprises:
a first reference voltage command generating section configured to generate a first reference voltage command based on said first torque command;
a first voltage limiting section configured to generate said first control data based on said output voltage of said battery and to limit said first reference voltage command based on said first and second control data to generate a first voltage command; and
a first power outputting section configured to output said first motor drive power to said first motor based on said first voltage command, and said second inverter comprises:
a second reference voltage command generating section configured to generate a second reference voltage command based on said second torque command;
a second voltage limiting section configured to generate said second control data based on said output voltage of said battery and to limit said second reference voltage command based on said first and second control data to generate a second voltage command; and
a second power outputting section configured to output said second motor drive power to said second motor based on said second voltage command.

17. The battery vehicle according to claim 16, further comprising:
a voltage sensor configured to sense said output voltage of said battery,
wherein said first reference voltage command comprises a first d-axis reference voltage command and a first q-axis reference voltage command, and said second reference voltage command comprises a second d-axis reference voltage command and a second q-axis reference voltage command,
said first voltage limiting section comprises:
a first voltage limit override coefficient generation section configured to generate a first d-axis voltage limit override coefficient based on said first d-axis reference voltage command and said sensed output voltage of said battery;

a first override coefficient generation section configured to generate a first d-axis override coefficient as said first control data from said first d-axis voltage limit override coefficient; and
a first limit section configured to limit said first reference voltage command based on said first control data and said second control data to generate said first voltage command, and said second voltage limiting section comprises:
a second voltage limit override coefficient generation section configured to generate a second d-axis voltage limit override coefficient based on said second d-axis reference voltage command and said sensed output voltage of said battery;
a second override coefficient generation section configured to generate a second d-axis override coefficient as said second control data from said second d-axis voltage limit override coefficient; and
a second limit section configured to limit said second reference voltage command based on said first control data and said second control data to generate said second voltage command.

18. The battery vehicle according to claim 17, wherein said first voltage limiting section further comprises:
a first voltage saturation override coefficient generation section configured to generate a first d-axis voltage saturation override coefficient and a first q-axis voltage saturation override coefficient from said first reference voltage command,
said first override coefficient generation section generates a first q-axis override coefficient in addition to said first d-axis override coefficient as said first control data from said first d-axis voltage saturation override coefficient and said first q-axis voltage saturation override coefficient in addition to said first d-axis voltage limit override coefficient,
said second voltage limiting section further comprises:
a second voltage saturation override coefficient generation section configured to generate a second d-axis voltage saturation override coefficient and a second q-axis voltage saturation override coefficient from said second reference voltage command, and
said second override coefficient generation section generates a second q-axis override coefficient in addition to said second d-axis override coefficient as said second control data from said second d-axis voltage saturation override coefficient and said second q-axis voltage saturation override coefficient in addition to said second d-axis voltage limit override coefficient.

19. The battery vehicle according to claim 18, wherein said first override coefficient generation section generates said first d-axis override coefficient by multiplying said first d-axis voltage saturation override coefficient and said first d-axis voltage limit override coefficient, and said first q-axis voltage saturation override coefficient as said first q-axis override coefficient, and
said second override coefficient generation section generates said second d-axis override coefficient by multiplying said second d-axis voltage saturation override coefficient and said second d-axis voltage limit override coefficient, and said second q-axis voltage saturation override coefficient as said second q-axis override coefficient.

20. The battery vehicle according to claim 19, wherein said first limit section generates said first voltage command by limiting said first d-axis reference voltage command based on a smaller one of said first d-axis override coefficient and said second d-axis override coefficient and said first q-axis reference voltage command based on said first q-axis voltage saturation override coefficient, and said second limit section generates said second voltage command by limiting said second d-axis reference voltage command based on a smaller one of said first d-axis override coefficient and said second d-axis override coefficient and said second q-axis reference voltage command based on said second q-axis voltage saturation override coefficient.

* * * * *